United States Patent Office 2,797,235
Patented June 25, 1957

2,797,235
TERTIARY ESTERS AND PREPARATION THEREOF

James A. Birbiglia, Nutley, George O. Chase, Hawthorne, and Julius Galender, West Paterson, N. J., assignors to Hoffmann-La Roche Inc., Nutley, N. J., a corporation of New Jersey No Drawing. Application September 1, 1954, Serial No. 453,682

16 Claims. (Cl. 260—488)

This invention relates to an improved synthesis of compounds useful (for example) in the perfume, cosmetic and pharmaceutical industries; and to novel intermediates and to novel subprocesses having utility in that improved synthesis. More particularly, the invention relates to an improvement in the manufacture of a class of esters of olefinic tertiary alcohols; to a novel class of esters of acetylenic tertiary alcohols useful as intermediates in the new synthesis; and to novel processes of preparing each of the foregoing classes of compounds.

Esters of terpenoid trisubstituted carbinols having the type formulas

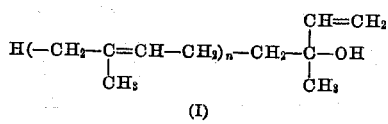

(I)

and

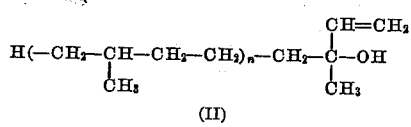

(II)

wherein n is a small integer, are of great value in the perfume and pharmaceutical industries. Thus, for example, linalyl acetate and linalyl propionate have long been used by perfumers, and isophythyl acetate is useful in the synthesis of pharmaceuticals. However, the manufacture of esters directly from the aforementioned trisubstituted carbinols, by prior art methods, is characterized by several hitherto non-avoidable shortcomings, among which may be mentioned the following: that the product is relatively poor in quality, not being a homogeneous material even after careful purification; that the overall yields are low, because of conversion of a large proportion of the carbinol starting material to byproducts other than the desired carbinyl ester; that the use of relatively expensive reagents and cumbersome operating conditions is required; and miscellaneous other disadvantages including, for instance, the requirement to use toxic reagents.

The present invention provides a process whereby esters of lower alkanoic acids with terpenoid trisubstituted carbinols of the type referred to above can be made in high purity and in excellent overall yield. This process is economical and easy to operate, uses relatively inexpensive and non-toxic reagents, and employs simple manipulative procedures which render the process readily adaptable to commercial manufacture on a large scale. The chemical transformations involved in the novel process can be illustrated graphically by the following equations:

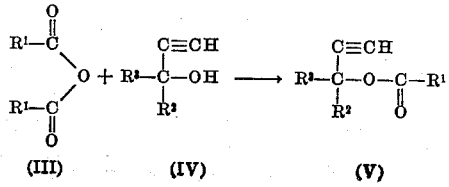

(III) (IV) (V)

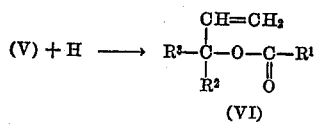

(VI)

In the above equations:

Formula (III) represents a lower alkanoic acid anhydried, such as acetic anhydride, propionic anhydride, isobutyric anhydride, formic-acetic anhydride, and the like; $R^1$ in the formula thus stands for hydrogen or lower alkyl, at least one $R^1$ being a lower alkyl radical; and it will be understood that "lower alkyl" includes both straight and branched chain radicals, such as methyl, ethyl, isobutyl, n-hexyl and the like.

Formula (IV) represents a terpenoid trisubstituted carbinol, wherein one substituent is the ethynyl radical, $C \equiv CH$; a second substituent ($R^2$) is a lower alkyl radical; and the third substituent ($R^3$) is a monovalent isoprenoid hydrocarbon radical

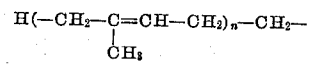

n being a small integer, or a hydrogenated analog of said isoprenoid hydrocarbon radical, e. g.

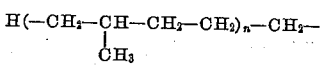

n having the same significance as above. Thus, in illustrative embodiments of the carbinol (IV) to which the invention is applicable, $R^2$ can represent specifically the radicals methyl, ethyl, isobutyl or the like. Similarly, $R^3$ can represent specifically the radicals 4-methyl-3-pentenyl or its hydrogenated analog 4-methylpentanyl; 4,8-dimethyl-3,7-nonadienyl or a hydrogenated analog thereof, e. g. 4,8-dimethylnonanyl; 4,8,12-trimethyl-3,7,11-tridecatrienyl or a hydrogenated analog thereof, e. g. 4,8,12-trimethyl-tridecanyl; and the like.

Formula (V) represents an acetylenic tertiary ester obtained by reacting compound (III) with compound (IV) in the presence of an acidic esterification catalyst; $R^1$, $R^2$, $R^3$, and n in Formula (V) having the same significance previously indicated.

Formula (VI) represents an olefinic tertiary ester obtained by selective hydrogenation of the acetylenic linkage of compound (V); $R^1$, $R^2$, $R^3$, and n having the same significance previously indicated.

In one of its comprehensive aspects, then, the invention relates to a process of making an ester having the formula

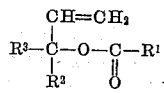

wherein $R^1$ is selected from the group consisting of hydrogen and lower alkyl radicals; $R^2$ is a lower alkyl radical; and $R^3$ is selected from the group consisting of monovalent radicals having the formula

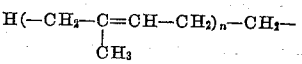

n being a small integer, and hydrogenated analogs thereof which comprises reacting an acetylenic trisubstituted carbinol having the formula

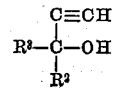

wherein $R^2$ and $R^3$ have the same meaning specified above, with a lower alkanoic acid anhydride having the formula

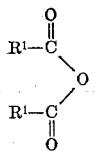

wherein $R^1$ is selected from the group consisting of hydrogen and lower alkyl radicals, at least one $R^1$ being a lower alkyl radical, in the presence of an acidic esterification catalyst and hydrogenating the acetylenic bond in the ester product substantially only to the olefinic stage.

In another aspect, the invention relates to a process of making compounds of Formula VI above which comprises selectively hydrogenating compounds of Formula V above. A specific embodiment of this aspect of the invention relates to a process of making an ester having the formula

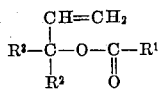

wherein $R^1$ is selected from the group consisting of hydrogen and lower alkyl radicals, $R^2$ is a lower alkyl radical, and $R^3$ is selected from the group consisting of monovalent radicals having the formula

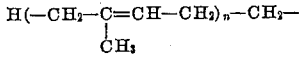

$n$ being a small integer, and hydrogenated analogs thereof, which comprises reacting an ester having the formula

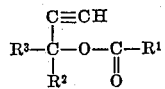

wherein $R^1$, $R^2$, and $R^3$ have the same meanings specified above, with approximately one mol of elemental hydrogen in the presence of a hydrogenation catalyst selective to catalyze the hydrogenation of an acetylenic linkage preferentially to an olefinic linkage. Catalysts having the specified characteristic are well known to the art; for example, see the publication by Lindlar, Helvetica Chimica Acta, 35, 446–450 (1952). Particularly preferred as selective hydrogenation catalysts are the lead-palladium hydrogenation catalysts disclosed in the cited publication. In one preferred method of operation, an ester of Formula V above, dissolved in an inert organic solvent, is reacted with elemental hydrogen in the presence of a lead-palladium hydrogenation catalyst and of quinoline, at normal temperatures and at moderate superatmospheric hydrogen pressures, until about one mol of hydrogen has been taken up.

In another aspect, the invention relates to novel intermediates, i. e. the acetylenic tertiary carbinyl lower alkanoates having the Formula V above, and to a process of making said intermediates which comprises reacting a lower alkanoic acid anhydride of Formula III above with an acetylenic trisubstituted carbinol of Formula IV above in the presence of an acidic esterification catalyst. A specific embodiment of such a process comprises mixing the carbinol (IV) with a slight molar excess of the alkanoic acid anhydride (III) at about room temperature in the presence of an acidic esterification catalyst. Among preferred acidic esterification catalysts are phosphoric acid and p-toluene-sulfonic acid, but other acidic esterification catalysts can be employed.

The novel intermediates of Formula V above constitute materials which are useful per se as odor-imparting agents, for example, in the preparation of perfumes and of scented compositions generally.

The trisubstituted carbinols of Formula IV above used as starting materials in the present invention all contain at least one asymmetric carbon atom, and hence can exist in optically active forms. Some of these starting materials are also capable of existing in geometrically isomeric forms, because of olefinic unsaturation in the isoprenoid radical. The invention is applicable to all of the stereoisomeric forms of the trisubstituted carbinol starting materials, and includes as well the preparation of all of the stereoisomeric forms of the novel intermediates and of the final products.

The invention has proved especially valuable as applied to those species of trisubstituted carbinol starting materials wherein $R^2$ is specifically methyl, and $R^3$ has one of the formulas

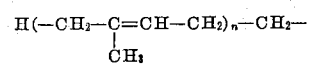

and

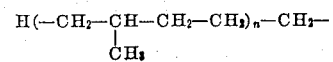

$n$ being 1, 2 or 3. For example, the invention is of particular value in the preparation of lower alkanoic acid esters of 3,7-dimethyl-1-octyn-6-en-3-ol and 3,7,11-trimethyl-1-dodecyn-6,10-dien-3-ol, which are representative of carbinols having the formula

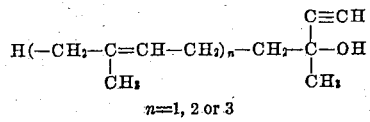

$n=1$, 2 or 3

(VII)

and similarly in the preparation of lower alkanoic acid esters of 3,7,11,15-tetramethyl-1-hexadecyn-3-ol, which is representative of carbinols having the formula

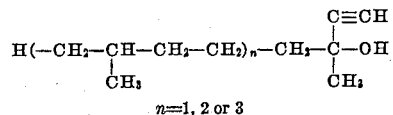

$n=1$, 2 or 3

(VIII)

and further in the preparation of the corresponding dihydro esters, i. e., respectively, lower alkanoic esters of 3,7-dimethyl-1,6-octadien-3-ol and 3,7,11-trimethyl-1,6,10-dodecatrien-3-ol, which are representative of carbinols having the formula

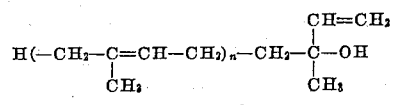

$n=1$, 2 or 3

(IX)

and lower alkanoic acid esters of 3,7,11,15-tetramethyl-1-hexadecen-3-ol, which is representative of carbinols having the formula

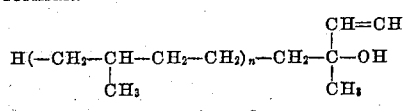

$n=1$, 2 or 3

(X)

Accordingly, the application of the novel synthesis in the preparation of the classes of esters referred to above represents a preferred aspect; but the invention is restricted only by the appended claims.

The invention is further disclosed in the following examples, which are likewise to be considered as illustrative but not limitative thereof.

*Example 1*

In a one-liter, round bottom, 3-necked flask equipped with a stirrer, dropping funnel, thermometer and calcium chloride tube, were placed 152 g. of racemic 3,7-dimethyl-1-octyn-6-en-3-ol of about 97 percent purity and 1.78 g. of 85 percent aqueous phosphoric acid. To the reaction mixture was added dropwise, over a period of about 2 hours, 122.5 g. of acetic anhydride of technical grade, about 99 percent pure. The reaction temperature was maintained at about 25° to 30° C. by means of a bath of cooling water. During the addition an energetic reaction took place, and the mixture darkened in color. After all of the acetic anhydride had been added, the reaction mixture was allowed to stand at room temperature for about 12 hours. Then a mixture of 200 ml. of water and 200 ml. of n-hexane was added to the reaction mixture and the whole was transferred to a separatory funnel and shaken. The aqueous phase was separated and the acidity of the oil phase was destroyed by washing with two 200 ml. portions of 10 percent aqueous sodium carbonate solution. The alkali was then removed from the oil layer by washing with water until neutral to litmus. The oil layer was dried and fractionated in high vacuum. The fraction boiling at 59°–60° C./1 mm. and having $n_D^{25}=1.4519$ was essentially racemic 3,7-dimethyl-1-octyn-6-en-3-yl acetate. This product has a pleasant fragrance, reminiscent of the scent of oil of bergamot.

A mixture of 97.1 g. of racemic 3,7-dimethyl-1-octyn-6-en-3-yl acetate, 97 ml. of n-hexane, 4.86 g. of a 5 percent palladium-on-calcium carbonate catalyst modified by deposition of lead thereon, prepared substantially according to the teachings of Lindlar at page 450 of the above cited publication, and 0.97 ml. of quinoline was placed in a laboratory hydrogenator. Hydrogen gas was then passed in at about 18 to 20° C. and at a gauge pressure of about 3 p. s. i. until the uptake of hydrogen ceased, at which time a test of an aliquot of the reaction mixture with ammoniacal silver nitrate gave a negative acetylenic test. The catalyst was then removed by filtration, and the quinoline was removed from the filtrate by washing with 10 percent aqueous sulfuric acid. The quinoline-free hexane solution was then washed to neutrality with dilute sodium bicarbonate solution. The hexane was removed in vacuo and the residue was distilled in high vacuum. The fraction boiling at 44° C./0.2 mm. and having $n_D^{25}=1.4479-1.4480$ was essentially racemic 3,7-dimethyl-1,6-octadien-3-yl acetate. This product has a pleasant fragrant scent reminiscent of the scent of commercial linalyl acetate.

*Example 2*

In a manner similar to that described in Example 1, 152 g. of racemic 3,7-dimethyl-1-octyn-6-en-3-ol and 122.5 g. of acetic anhydride were reacted, using 1.52 g. of p-toluenesulfonic acid monohydrate as an esterification catalyst, to yield racemic 3,7-dimethyl-1-octyn-6-en-3-yl acetate. The latter was catalytically hydrogenated, using the same lead-palladium catalyst as used in Example 1, and using a feed pressure of hydrogen of about 2 p. s. i. gauge, to yield racemic 3,7-dimethyl-1,6-octadien-3-yl acetate, identical with the same ester produced according to Example 1.

*Example 3*

In a manner similar to that described in Example 1, 304 g. of racemic 3,7-dimethyl-1-octyn-6-en-3-ol was reacted with 312 g. of propionic anhydride in the presence of 3.56 g. of 85 percent aqueous phosphoric acid. The ester product was separated, washed and fractionated in the manner described in Example 1. The fraction boiling at 53–55° C./0.1 mm. and having $n_D^{25}=1.4518-1.4520$ was essentially racemic 3,7-dimethyl-1-octyn-6-en-3-yl propionate. This product has a spicy fresh bergamot odor.

A mixture of racemic 3,7-dimethyl-1-octyn-6-en-3-yl propionate, 600 ml. of petroleum naphtha and 3.0 g. of Lindlar catalyst (prepared as in Example 1) was subjected to hydrogenation in the manner described in Example 1. The catalyst was filtered off and the organic solution was washed and fractionated in the manner described in Example 1. The fraction boiling at 52–54° C./0.1 mm. and having $n_D^{25}=1.4480$ was essentially racemic 3,7-dimethyl-1,6-octadien-3-yl propionate. This product has a pleasant fragrant scent reminiscent of the odor of lily of the valley.

*Example 4*

152 g. of racemic 3,7-dimethyl-1-octyn-6-en-3-ol was reacted with 188.5 g. of n-butyric anhydride, using 3.0 g. of 85 percent aqueous phosphoric acid as esterification catalyst, in a manner generally similar to that described in Example 1. The ester product was separated, washed and fractionated in the manner described in Example 1. The fraction boiling at 80–82° C./0.2 mm. and having $n_D^{25}=1.4512-1.4514$ was essentially racemic 3,7-dimethyl-1-octyn-6-en-3-yl n-butyrate. This product has a fruity fragrance.

Racemic 3,7-dimethyl-1-octyn-6-en-3-yl n-butyrate was hydrogenated with the aid of a Lindlar palladium-lead catalyst in the manner described in Example 1. The ester was isolated as described in Example 1. The fraction boiling at 80–82° C./0.2 mm. and having $n_D^{25}=1.4482-1.4484$ was essentially racemic 3,7-dimethyl-1,6-octadien-3-yl n-butyrate. This product has a pleasant fragrant scent of a citrus-lavender character.

*Example 5*

Similarly as described in Example 1, 152 g. of racemic 3,7-dimethyl-1-octyn-6-en-3-ol was reacted with 190 g. of isobutyric anhydride in the presence of 2.8 g. of 85 percent aqueous phosphoric acid. The ester product was isolated as in Example 1. The fraction boiling at 58–60° C./0.2 mm. and having $n_D^{25}=1.4478-1.4480$ was essentially racemic 3,7-dimethyl-1-octyn-6-en-3-yl isobutyrate. This product has an odor reminiscent of peaches.

Upon hydrogenation in the manner described in Example 1, racemic 3,7-dimethyl-1-octyn-6-en-3-yl isobutyrate yielded a fraction boiling at 63–65° C./0.1 mm. and having $n_D^{25}=1.4449-1.4451$, which was essentially racemic 3,7-dimethyl-1,6-octadien-3-yl isobutyrate. This product has a pleasant fruity fragrance reminiscent of the odor of peaches.

*Example 6*

In a one-liter, 3-necked flask equipped with a stirrer, thermometer and dropping funnel was placed 200 ml. of acetic anhydride. To this was added slowly with stirring 100 ml. of 98 percent formic acid. Considerable heat was evolved, but the temperature was maintained below 30° C. by cooling.

When the evolution of heat had ceased, 1.78 g. of 85 percent aqueous phosphoric acid was added, and then 152 g. of racemic 3,7-dimethyl-1-octyn-6-en-3-ol was added in a single portion, and the homogeneous reaction mixture was permitted to stand at room temperature for four days. At the end of this time the reaction mixture was diluted with 200 ml. of petroleum naphtha, the free acidity was removed by washing in turn with water, and with 10 percent sodium carbonate solution to pH 11, and finally with water again until the water wash was neutral to red litmus. The water layer was removed and the organic residue was fractionated. The fraction boiling at 45–47° C./0.07 mm. and having $n_D^{25}=1.4550$ was essentially racemic 3,7-dimethyl-1-octyn-6-en-3-yl formate. This product has a pleasant odor reminiscent of the fragrance of orange blossoms and of bergamot.

270 g. of the above formate ester, dissolved in 540 ml. of petroleum naphtha, was hydrogenated in the presence of 2.7 g. of Lindlar palladium-lead catalyst, in the manner described in Example 1. The catalyst was filtered off and the organic solution was washed and fractionated as described in Example 1. The fraction boiling at 41–42° C./0.3 mm. and having $n_D^{25}=1.4529-1.4531$ was essentially racemic 3,7-dimethyl-1,6-octadien-3-yl-formate. This product has a light floral odor.

Example 7

In a two-liter, 3-necked flask equipped with a sealed stirrer, thermometer and dropping funnel was placed 440 g. of racemic 3,7,11-trimethyl-1-dodecyn-6,10-dien-3-ol, 245 g. of acetic anhydride and 3.56 g. of 90 percent aqueous phosphoric acid. The reaction mixture was stirred for 2–3 hours, the temperature being maintained below 30° C. by means of a cooling bath, and was then permitted to stand at room temperature overnight. Then 500 ml. of petroleum ether was added and the free acidity was removed by washing in turn with water, 10 percent sodium carbonate solution and water until neutral to red litmus. The aqueous layer was separated off and the organic layer was fractionated. The fraction boiling at 96–98° C./0.1 mm. and having $n_D^{25}=1.4693-1.4695$ was essentially racemic 3,7,11-trimethyl-1-dodecyn-6,10-dien-3-yl acetate. This product has a pleasant fragrance reminiscent of cedar wood.

375 g. of the above acetate ester dissolved in 750 ml. of petroleum naphtha was hydrogenated as described in Example 1, using 3.75 g. of Lindlar palladium-lead catalyst. After completion of the hydrogenation, the product was isolated by fractionation, in the manner described in Example 1. The fraction boiling at 89–90° C./0.09 mm. and having $n_D^{25}=1.4469-1.4472$ was essentially the acetate of racemic 3,7,11-trimethyl-1,6,10-dodecatrien-3-ol. This product has a pleasant fragrance reminiscent of cedar wood.

Example 8

In a manner similar to that described in Example 6, 289 ml. of acetic anhydride were reacted with 145 ml. of 98 percent formic acid, and to the reaction product was added 3.8 g. of 85 percent aqueous phosphoric acid and 220 g. of racemic 3,7,11-trimethyl-1-dodecyn-6,10-dien-3-ol. The ester product was worked up in the manner described in Example 6. The fraction boiling at 88–90° C./0.3 mm. and having $n_D^{25}=1.4728-1.4730$ was essentially racemic 3,7,11-trimethyl-1-dodecyn-6,10-dien-3-yl formate. This product has a pleasant odor reminiscent of the fragrance of cedar wood.

50 g. of the above formate ester, dissolved in 200 ml. of petroleum naphtha, was hydrogenated using 0.5 g. of Lindlar palladium-lead catalyst, in the manner described in Example 1. The hydrogenation product was worked up as described in Example 1. The fraction boiling at 97–99° C./0.3 mm. and having $n_D^{25}=1.4688-1.4690$ was essentially racemic 3,7,11-trimethyl-1,6,10-dodecatrien-3-yl formate. This product has a fragrance reminiscent of cedar wood.

Example 9

In a manner similar to that described in Example 7, 220.2 g. of racemic 3,7,11-trimethyl-1-dodecyn-6,10-dien-3-ol was reacted with 156.2 g. of propionic anhydride in the presence of 2.6 g. of 85 percent aqueous phosphoric acid. The ester product was separated, washed and fractionated in the manner described in Example 7. The fraction boiling at 125–127° C./0.1 mm. and having $n_D^{25}=1.4679-1.4681$ was essentially racemic 3,7,11-trimethyl-1-dodecyn-6,10-dien-3-yl propionate. This product has a light floral odor, suggestive of cedar wood.

Racemic 3,7,11-trimethyl-1-dodecyn-6,10-dien-3-yl propionate was hydrogenated as described in Example 7. The fraction boiling at 108–110° C./0.1 mm. and having $n_D^{25}=1.4658-1.4660$ was essentially racemic 3,7,11-trimethyl-1,6,10-dodecatrien-3-yl propionate. This product has a pleasant fragrance reminiscent of the odor of cedar wood.

Example 10

Using a procedure similar to that of Example 7, 55 g. of 3,7,11-trimethyl-1-dodecyn-6,10-dien-3-ol was reacted with 47.5 g. of isobutyric anhydride in the presence of 0.5 g. of 85 percent aqueous phosphoric acid. The ester product was isolated as described in Example 7. The fraction boiling at 120–125° C./0.1 mm. and having $n_D^{25}=1.4638-1.4640$ was essentially racemic 3,7,11-trimethyl-1-dodecyn-6,10-dien-3-yl isobutyrate. This product has a pleasant floral odor.

A mixture of 50 g. of racemic 3,7,11-trimethyl-1-dodecyn-6,10-dien-3-yl-isobutyrate, 200 ml. of petroleum naphtha and 0.5 g. of Lindlar palladium-lead catalyst was subjected to hydrogenation in the manner described in Example 7. The catalyst was filtered off and the organic solution was washed and fractionated in the manner described in Example 7. The fraction boiling at 110–112° C./0.2 mm. and having $n_D^{25}=1.4621-1.4623$ was essentially racemic 3,7,11-trimethyl-1,6,10-dodecatrien-3-yl isobutyrate. This product has a pleasant floral fragrance.

Example 11

In a manner similar to that described in Example 7, 220.2 g. of 3,7,11-trimethyl-1-dodecyn-6,10-dien-3-ol was reacted with 189.5 g. of n-butyric anhydride in the presence of 2.6 g. of 85 percent aqueous phosphoric acid. The ester product was worked up as described in Example 7. The fraction boiling at 137–139° C./0.4 mm. and having $n_D^{25}=1.4667-1.4669$ was essentially racemic 3,7,11 - trimethyl - 1 - dodecyl-6,10-dien-3yl n-butyrate. This product has a pleasant fruity odor.

A mixture of 146 g. of racemic 3,7,11-trimethyl-1-dodecyn-6,10-dien-3-yl n-butyrate, 300 ml. of petroleum naphtha and 1.5 g. of Lindlar catalyst was subjected to hydrogenation in the manner described in Example 7. The product fraction boiling at 121–123° C./0.2 mm. and having $n_D^{25}=1.4657-1.4659$ was essentially racemic 3,7,11-trimethyl-1,6,10-dodecatrien-3-yl n-butyrate. This product has a pleasant fragrance with fruity notes.

Example 12

In a manner similar to that described in Example 1, 294.5 g. of racemic 3,7,11,15-tetromethyl-1-hexadecyl-3-ol was reacted with 122.5 g. of acetic anhydride, using 3 g. of 85 percent phosphoric acid as an esterification catalyst. The ester product was worked up as described in Example 1. The fraction boiling at 145–147° C./0.2 mm. and having $n_D^{25}=1.4497-1.4502$ was essentially racemic 3,7,11,15-tetramethyl-1-hexadecyn-3-yl acetate.

168.2 g. of the above acetate ester dissolved in 168 ml. of petroleum naphtha was hydrogenated using 1.7 g. of Lindlar palladium-lead catalyst, and worked up in the same manner as the hydrogenation product of Example 1. The fraction boiling at 140–142° C./0.2 mm. and having $n_D^{25}=1.4486-1.4490$ was essentially racemic 3,7,11,15-tetromethly-1-hexadecen-3-yl acetate. This ester is useful in the synthesis of vitamin K according to known procedures, e. g. that described in U. S. Patent 2,683,176.

This application is a continuation-in-part of our prior copending application Serial No. 429,128, filed May 11, 1954, and now abandoned.

We claim:
1. A process of making an ester having the formula

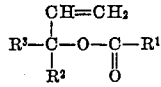

wherein $R^1$ is selected from the group consisting of hydrogen and lower alkyl rodicals; $R^2$ is the methyl radical; and $R^3$ is selected from the group consisting of monovalent radicals having the formula

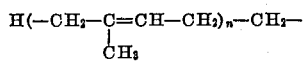

$n$ being a small integer, and hydrogenated analogs thereof which comprises reacting an acetylenic trisubstituted carbinol having the formula

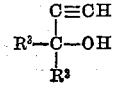

wherein $R^2$ and $R^3$ have the same meaning specified above with a lower alkanoic acid anhydride having the formula $$\begin{array}{c} O \\ \| \\ R^1-C \\ \phantom{R^1-C}\diagdown \\ \phantom{R^1-CCCC}O \\ \phantom{R^1-C}\diagup \\ R^1-C \\ \| \\ O \end{array}$$

wherein $R^1$ is selected from the group consisting of hydrogen and lower alkyl radicals, at least one $R^1$ being a lower alkyl radical in the presence of an acidic esterification catalyst and hydrogenating the actylenic bond in the ester product substantially only to the olefinic stage.

2. A process according to claim 1 wherein $R^3$ represents a radical having the formula $$H(-CH_2-C=CH-CH_2)_n-CH_2- \\ \phantom{H(-CH_2-}|\phantom{CCCCCCCCCC} \\ \phantom{H(-CH_2-}CH_3$$

$n$ being an integer from 1 to 3, inclusive.

3. A process according to claim 1 wherein $R^3$ represents a radical having the formula $$H(-CH_2-CH-CH_2-CH_2)_n-CH_2- \\ \phantom{H(-CH_2-}|\phantom{CCCCCCCCCCCC} \\ \phantom{H(-CH_2-}CH_3$$

$n$ being an integer from 1 to 3, inclusive.

4. A process of making an ester having the formula $$\begin{array}{c} CH=CH_2 \\ | \\ H(-CH_2-C=CH-CH_2)_n-CH_2-C-O-C-\text{lower alkyl} \\ |\phantom{CCCCCCCCCCCCC}|\phantom{CC}\| \\ CH_3 \phantom{CCCCCCCCCCCCC} CH_3\phantom{CC} O \end{array}$$

which comprises reacting a trisubstituted carbinol of the formula $$\begin{array}{c} C\equiv CH \\ | \\ H(-CH_2-C=CH-CH_2)_n-CH_2-C-OH \\ |\phantom{CCCCCCCCCCCCC}| \\ CH_3\phantom{CCCCCCCCCCCCCC} CH_3 \end{array}$$

with a lower alkanoic acid anhydride in the presence of an acidic esterification catalyst and hydrogenating the acetylenic bond in the ester product substantially only to the olefinic stage; $n$ in the above formulas being an integer from 1 to 3, inclusive.

5. A process of making an ester having the formula $$\begin{array}{c} C\equiv CH \\ | \\ R^3-C-O-C-R^1 \\ |\phantom{CC}\| \\ R^2\phantom{CC} O \end{array}$$

wherein $R^1$ is selected from the group consisting of hydrogen and lower alkyl radicals; $R^2$ is the methyl radical; and $R^3$ is selected from the group consisting of monovalent radicals having the formula $$H(-CH_2-C=CH-CH_2)_n-CH_2- \\ \phantom{H(-CH_2-}|\phantom{CCCCCCCCCC} \\ \phantom{H(-CH_2-}CH_3$$

$n$ being a small integer, and hydrogenated analogs thereof which comprises reacting a tertiary carbinol having the formula $$\begin{array}{c} C\equiv CH \\ | \\ R^3-C-OH \\ | \\ R^2 \end{array}$$

wherein $R^2$ and $R^3$ have the same meaning specified above with a lower alkanoic acid anhydride in the presence of an acidic esterification catalyst.

6. An ester of a lower alkanoic acid with a trisubstituted carbinol wherein one substituent is the ethynyl radical, a second substituent is the methyl radical, and a third substituent is a monovalent radical selected from the class consisting of isoprenoid radicals having the formula $$H(-CH_2-C=CH-CH_2)_n-CH_2- \\ \phantom{H(-CH_2-}|\phantom{CCCCCCCCCC} \\ \phantom{H(-CH_2-}CH_3$$

$n$ being a small integer and hydrogenated analogs of said isoprenoid radicals.

7. A process of making an ester having the formula $$\begin{array}{c} CH=CH_2 \\ | \\ R^3-C-O-C-R^1 \\ |\phantom{CC}\| \\ R^2\phantom{CC} O \end{array}$$

wherein $R^1$ is selected from the group consisting of hydrogen and lower alkyl radicals; $R^2$ is the methyl radical; and $R^3$ is selected from the group consisting of monovalent radicals having the formula $$H(-CH_2-C=CH-CH_2)_n-CH_2- \\ \phantom{H(-CH_2-}|\phantom{CCCCCCCCCC} \\ \phantom{H(-CH_2-}CH_3$$

$n$ being a small integer, and hydrogenated analogs thereof which comprises reacting an ester having the formula $$\begin{array}{c} C\equiv CH \\ | \\ R^3-C-O-C-R^1 \\ |\phantom{CC}\| \\ R^2\phantom{CC} O \end{array}$$

wherein $R^1$, $R^2$ and $R^3$ have the same meanings specified above with approximately one mol of elemental hydrogen in the presence of a hydrogenation catalyst selective to catalyze the hydrogenation of an acetylenic linkage preferentially to an olefinic linkage.

8. A process of making an ester having the formula $$\begin{array}{c} C\equiv CH \\ | \\ H(-CH_2-C=CH-CH_2)_n-CH_2-C-O-C-\text{lower alkyl} \\ |\phantom{CCCCCCCCCCCCC}|\phantom{CC}\| \\ CH_3\phantom{CCCCCCCCCCCCC} CH_3\phantom{CC} O \end{array}$$

which comprises reacting a tertiary carbinol of the formula $$\begin{array}{c} C\equiv CH \\ | \\ H(-CH_2-C=CH-CH_2)_n-CH_2-C-OH \\ |\phantom{CCCCCCCCCCCCC}| \\ CH_3\phantom{CCCCCCCCCCCCCC} CH_3 \end{array}$$

with a lower alkanoic acid anhydride in the presence of an acidic esterification catalyst; $n$ in the above formulas being an integer from 1 to 3, inclusive.

9. An ester having the formula $$\begin{array}{c} C\equiv CH \\ | \\ H(-CH_2-C=CH-CH_2)_n-CH_2-C-O-C-\text{lower alkyl} \\ |\phantom{CCCCCCCCCCCCC}|\phantom{CC}\| \\ CH_3\phantom{CCCCCCCCCCCCC} CH_3\phantom{CC} O \end{array}$$

$n$ being an integer from 1 to 3, inclusive.

10. A process of making an ester having the formula $$\begin{array}{c} CH=CH_2 \\ | \\ H(-CH_2-C=CH-CH_2)_n-CH_2-C-O-C-\text{lower alkyl} \\ |\phantom{CCCCCCCCCCCCC}|\phantom{CC}\| \\ CH_3\phantom{CCCCCCCCCCCCC} CH_3\phantom{CC} O \end{array}$$

which comprises reacting a compound of the formula $$\begin{array}{c} C\equiv CH \\ | \\ H(-CH_2-C=CH-CH_2)_n-CH_2-C-O-C-\text{lower alkyl} \\ |\phantom{CCCCCCCCCCCCC}|\phantom{CC}\| \\ CH_3\phantom{CCCCCCCCCCCCC} CH_3\phantom{CC} O \end{array}$$

with approximately one mol of elemental hydrogen in the presence of a hydrogenation catalyst selective to catalyze the hydrogenation of an acetylenic linkage substantially only to the olefinic stage; $n$ in the above formulas being an integer from 1 to 3, inclusive.

11. A process of making an ester having the formula $$\begin{array}{c} C\equiv CH \\ | \\ H(-CH_2-CH-CH_2-CH_2)_n-CH_2-C-O-C-\text{lower alkyl} \\ |\phantom{CCCCCCCCCCCCCC}|\phantom{CC}\| \\ CH_3\phantom{CCCCCCCCCCCCCC} CH_3\phantom{CC} O \end{array}$$

which comprises reacting a tertiary carbinol of the formula $$\begin{array}{c} C\equiv CH \\ | \\ H(-CH_2-CH-CH_2-CH_2)_n-CH_2-C-OH \\ |\phantom{CCCCCCCCCCCCCC}| \\ CH_3\phantom{CCCCCCCCCCCCCCC} CH_3 \end{array}$$

with a lower alkanoic acid anhydride in the presence of an acidic esterification catalyst; $n$ in the above formulas being an integer from 1 to 3, inclusive.

12. A process of making an ester having the formula

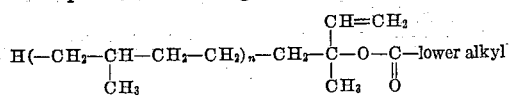

which comprises reacting a compound of the formula

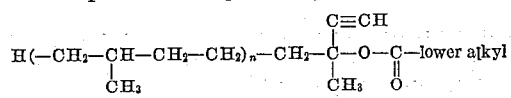

with approximately one mol of elemental hydrogen in the presence of a hydrogenation catalyst selective to catalyze the hydrogenation of an acetylenic linkage substantially only to the olefinic stage; $n$ in the above formulas being an integer from 1 to 3, inclusive.

13. A process of making 3,7-dimethyl-1,6-octadien-3-yl acetate which comprises reacting 3,7-dimethyl-1-octyn-6-en-3-ol with acetic anhydride in the presence of an acidic esterification catalyst thereby producing 3,7-dimethyl-1-octyn-6-en-3-yl acetate, and reacting the latter with approximately one mol of elemental hydrogen in the presence of a hydrogenation catalyst selective to catalyze the hydrogenation of an acetylenic linkage preferentially to an olefinic linkage.

14. 3,7-dimethyl-1-octyn-6-en-3-yl acetate.

15. A process of making 3,7-dimethyl-1,6-octadien-3-yl acetate which comprises reacting 3,7-dimethyl-1-octyn-6-en-3-yl acetate with approximately one mol of elemental hydrogen in the presence of a hydrogenation catalyst selective to catalyze the hydrogenation of an acetylenic linkage preferentially to an olefinic linkage.

16. A process according to claim 15 wherein the hydrogenation catalyst is a lead-palladium hydrogenation catalyst.

References Cited in the file of this patent

UNITED STATES PATENTS 2,423,545    Aeschbach _____ July 8, 1947

FOREIGN PATENTS 261,120    Switzerland _____ Aug. 1, 1949

OTHER REFERENCES

Ruzicka et al.: Helv. Chim. Acta 2 (1919), 182.
Ruzicka et al.: Helv. Chim. Acta 22 (1939), 392–6.
Simonsen et al.: The Terpenes (Cambridge University Press, Cambridge, England, 1952), vol. 3, pp. 121–4.